(12) United States Patent
Hoshina et al.

(10) Patent No.: US 9,377,096 B2
(45) Date of Patent: Jun. 28, 2016

(54) WAVE GENERATOR OF STRAIN WAVE GEARING

(71) Applicant: Harmonic Drive Systems Inc., Shinagawa-ku (JP)

(72) Inventors: Tatsuro Hoshina, Azumino (JP); Yoshihide Kiyosawa, Azumino (JP)

(73) Assignee: HARMONIC DRIVE SYSTEMS INC., Shinagawa-Ku, Tokyo (JP)

(*) Notice: Subject to any disclaimer, the term of this patent is extended or adjusted under 35 U.S.C. 154(b) by 108 days.

(21) Appl. No.: 14/397,526

(22) PCT Filed: May 8, 2013

(86) PCT No.: PCT/JP2013/002968
§ 371 (c)(1),
(2) Date: Oct. 28, 2014

(87) PCT Pub. No.: WO2014/181376
PCT Pub. Date: Nov. 13, 2014

(65) Prior Publication Data
US 2016/0047451 A1    Feb. 18, 2016

(51) Int. Cl.
*F16H 35/00*    (2006.01)
*F16H 49/00*    (2006.01)
(Continued)

(52) U.S. Cl.
CPC ............ *F16H 49/001* (2013.01); *F16C 19/463* (2013.01); *F16C 33/4641* (2013.01); *F16H 2049/003* (2013.01)

(58) Field of Classification Search
CPC .................................................... F16H 49/001

USPC ......................................................... 74/640
See application file for complete search history.

(56) References Cited

U.S. PATENT DOCUMENTS 3,642,331 A * 2/1972 Silver .................... F16C 17/024
                                                       384/102
4,099,427 A    7/1978 Fickelscher
(Continued)

FOREIGN PATENT DOCUMENTS

JP    48-21046 U    3/1973
JP    52-47164 A    4/1977
(Continued)

OTHER PUBLICATIONS

International Search Report (PCT/ISA/210) mailed on *, by the * Patent Office as the International Searching Authority for International Application No. PCT/JP2013/002968.

*Primary Examiner* — Ha D Ho
(74) *Attorney, Agent, or Firm* — Buchanan Ingersoll & Rooney PC (57) ABSTRACT

A wave generator of a strain wave gearing has a rigid plug and a needle roller bearing mounted on the plug external peripheral surface. The plug external peripheral surface has a retainer engaging part for engaging with a retainer that would move in an axis line direction and for restricting the movement thereof along the axis line direction. The retainer has an outer ring engaging part for engaging with an outer ring that would move in the axis line direction and for restricting the movement thereof along the axis line direction. The movements of the retainer and the outer ring can be restricted without providing a separate member. A wave generator of a strain way gearing can be realized, which is provided with a roller bearing capable of restricting the movement of the outer ring with a simple structure.

4 Claims, 6 Drawing Sheets

(51) Int. Cl.
*F16C 19/46* (2006.01)
*F16C 33/46* (2006.01)

(56) References Cited

U.S. PATENT DOCUMENTS 4,434,682 A * 3/1984 Fickelscher ............... F16H 1/32
475/162

5,061,227 A * 10/1991 Fickelscher ......... F04C 15/0065
475/166
7,484,436 B2 * 2/2009 Kiyosawa ............... F16C 19/52
184/6.12

FOREIGN PATENT DOCUMENTS

| JP | 5-164198 A | 6/1993 |
| JP | 2003-206924 A | 7/2003 |
| JP | 2009-299780 A | 12/2009 |

\* cited by examiner

WAVE GENERATOR OF STRAIN WAVE GEARING

TECHNICAL FIELD

The present invention relates to a wave generator of a strain wave gearing, and particularly relates to a wave generator having a roller bearing.

BACKGROUND ART

One known example of a strain wave gearing is a flat strain wave gearing. In a flat strain wave gearing, a cylindrical flexible externally toothed gear capable of meshing with two rigid internally toothed gears having different numbers of teeth is disposed on the inner sides of the rigid internally toothed gears. A wave generator is disposed on the inner side of the flexible externally toothed gear. The flexible externally toothed gear is made to flex into an ellipsoidal shape by the wave generator, and is meshed with both rigid internally toothed gears.

A flat strain wave gearing is in some cases used as a hollow strain wave gearing having a hollow part passing through the center in the along axial direction of the device. Hollow wave generators having rigid plug formed with a through-hole in the center are used as such a hollow strain wave gearing. To increase the inside diameter dimension of the hollow part without increasing the outside diameter dimension of the device, a hollow through-hole having a large inside diameter must be formed in the rigid plug. To achieve this, a roller bearing, particularly a needle roller bearing, of less radial thickness than a ball bearing is preferably used in the wave generator. Patent Document 1 discloses a flat strain wave gearing that has a wave generator using a roller bearing.

PRIOR ART DOCUMENTS

Patent Documents

[Patent Document 1] JP 2009-299780 A

SUMMARY OF THE INVENTION

Problems to be Solved by the Invention

When a roller bearing is used in the wave generator, there are no portions equivalent to the trajectory grooves of the inner and outer rings in a common ball bearing. Specifically, the inner ring trajectory surface and the outer ring trajectory surface of the roller bearing are flat surfaces when viewed along the center axis line direction. Rollers mounted between these trajectory surfaces or a retainer holding the rollers must be constrained so as to not move in the center axis line direction. The inner ring fits with the external peripheral surface of the rigid plug and therefore does not move in the center axis line direction, but the outer ring must be constrained so as to not move in the center axis line direction. Therefore, a restricting member such as a thrust washer must be attached to the rigid plug in a manner of sandwiching the roller bearing on both sides, to restrict the movement of the outer ring with the rollers or the retainer.

An object of the present invention is to provide a wave generator of a strain wave gearing in which the movement of an outer ring and a retainer holding rollers can be restricted without a restricting member.

Another object of the present invention is to provide a hollow strain wave gearing comprising such a wave generator.

Means to Solve the Problems

To solve the problems described above, according to the present invention, there is provided a wave generator of a strain wave gearing in which a flexible externally toothed gear is made to flex into an ellipsoidal shape and partially mesh with a rigid internally toothed gear, and the meshing positions of the two gears are moved in a circumferential direction; the wave generator characterized in comprising:

a rigid plug and a roller bearing mounted on an ellipsoidal plug external peripheral surface of the rigid plug, wherein the roller bearing has an ellipsoidal inner ring trajectory surface formed in the plug external peripheral surface, an outer ring capable of flexing in a radial direction, an outer ring trajectory surface formed in the inner peripheral surface of the outer ring, a plurality of rollers mounted in a rollable state between the inner ring trajectory surface and the outer ring trajectory surface, and a cylindrical retainer having pockets in which each of the rollers is held in a rollable state at predetermined intervals;

the plug external peripheral surface has a retainer engaging part for engaging with the retainer that would move in an axis line direction of the roller bearing and restricting a movement of the retainer in the axis line direction; and the retainer has an outer ring engaging part for engaging with the outer ring that would move in the axis line direction and restricting a movement of the outer ring in the axis line direction.

The wave generator of the strain wave gearing of the present invention has the roller bearing, and the inner ring trajectory surface of the roller bearing is formed directly in the ellipsoidal plug external peripheral surface of the rigid plug, skipping the inner ring. Therefore, the radial thickness of the roller bearing can be reduced, and a hollow through-hole having a larger inside diameter than in conventional practice can be formed in a wave generator of the same diameter. Consequently, the wave generator of the present invention is suitable for use as a wave generator of a hollow strain wave gearing provided with a hollow part having a large inside diameter.

In the wave generator of the present invention, the retainer engaging part is provided in the plug external peripheral surface, and the retainer is restricted so as to not move in the axis line direction. Similarly, the outer ring engaging part is provided in the retainer, and the outer ring is restricted so as to not move in the axis line direction. Specifically, the outer ring is restricted via the retainer so as to not move in the axis line direction relative to the rigid plug. Therefore, there is no need to separately provide a restricting member for restricting the movement of the outer ring and the retainer holding the rollers.

Consequently, in the wave generator of the present invention, because the inner ring of the roller bearing is skipped and there is no need for a restricting member for restricting the movement of the retainer and the outer ring, the structure can be simplified, reduced in weight, and the number of configurative components can be reduced.

The roller bearing of the wave generator is mounted between the high-speed rotating rigid plug and the low-speed rotating flexible externally toothed gear. When a restricting member is attached to the high-speed rotating rigid plug, there is a large difference in rotating speeds between the restricting member and the outer ring, and the contact portions of these members are therefore readily worn down. In the present invention, the movement of the outer ring is restricted by the retainer, which has a slower rotating speed than the rigid plug (inner ring). Therefore, the difference in rotating speeds between the two is small, and the wear occurring in the contact portions thereof can therefore be suppressed.

In the wave generator of the present invention, the retainer engaging part and the outer ring engaging part are configured as follows. Specifically, in the wave generator of the present invention:

first and second small-diameter external peripheral surface portions smaller in diameter than the inner ring trajectory surface are formed in the plug external peripheral surface in portions on both sides of the inner ring trajectory surface;

a first annular stepped surface facing one way in the axis line direction is formed between the inner ring trajectory surface and the first small-diameter external peripheral surface portion, and a second annular stepped surface facing the other way in the axis line direction is formed between the inner ring trajectory surface and the second small-diameter external peripheral surface portion;

the retainer comprises a cylinder part in which the pockets are formed at predetermined intervals in the circumferential direction, first and second annular inner-side protrusions protruding radially inward from both ends of the cylinder part, and first and second annular outer-side protrusions protruding radially outward from both ends of the cylinder part;

the inner ring trajectory surface is positioned between the first and second annular inner-side protrusions;

the outer ring is positioned between the first and second annular outer-side protrusions;

the retainer engaging part is comprised of the first and second annular stepped surfaces; and the outer ring engaging part is comprised of the first and second annular outer-side protrusions.

In the wave generator of the present invention, the retainer engaging part and the outer ring engaging part can be configured as follows. Specifically:

an inner ring trajectory groove extending in the circumferential direction and having a constant width and constant depth is formed in the plug external peripheral surface;

the inner ring trajectory surface is formed in a groove bottom surface of the inner ring trajectory groove;

the retainer comprises a cylinder part in which the pockets are formed at predetermined intervals in the circumferential direction, and first and second annular outer-side protrusions protruding radially outward from both ends of the cylinder part;

the retainer is positioned in the inner ring trajectory groove while the outer ring is positioned between the first and second annular outer-side protrusions;

the retainer engaging part is comprised of groove side surfaces on both sides of the inner ring trajectory groove; and the outer ring engaging part is comprised of the first and second annular outer-side protrusions.

Next, the hollow strain wave gearing of the present invention is characterized in comprising:

a rigid internally toothed gear;

a flexible externally toothed gear disposed on the inner side of the rigid internally toothed gear and capable of meshing with the rigid internally toothed gear;

a wave generator for causing the flexible externally toothed gear to flex into an ellipsoidal shape to partially mesh with the rigid internally toothed gear and causing the meshing positions of the two gears to move in the circumferential direction, the wave generator being disposed on the inner side of the flexible externally toothed gear; and a rotating input shaft composed of a hollow shaft;

the wave generator being the wave generator of the above configuration; and the rigid plug of the wave generator being integrally formed in the external peripheral surface of the rotating input shaft.

The wave generator incorporated in the hollow strain wave gearing of the present invention has a small number of configurative components and small radial thickness. Therefore, a hollow strain wave gearing comprising a hollow part of large inside diameter can be achieved.

The hollow strain wave gearing of the present invention can be a flat strain wave gearing comprising a first internally toothed gear and a second internally toothed gear having different numbers of teeth and disposed in the direction of the device axis line as rigid internally toothed gears, the flexible externally toothed gear comprising a cylinder body capable of flexing in the radial direction and external teeth formed in the external peripheral surface of the cylinder body.

MODE FOR CARRYING OUT THE INVENTION

An embodiment of a hollow strain wave gearing incorporating a wave generator to which the present invention is applied is described below with reference to the drawings.

Overall Configuration

Figure 1:
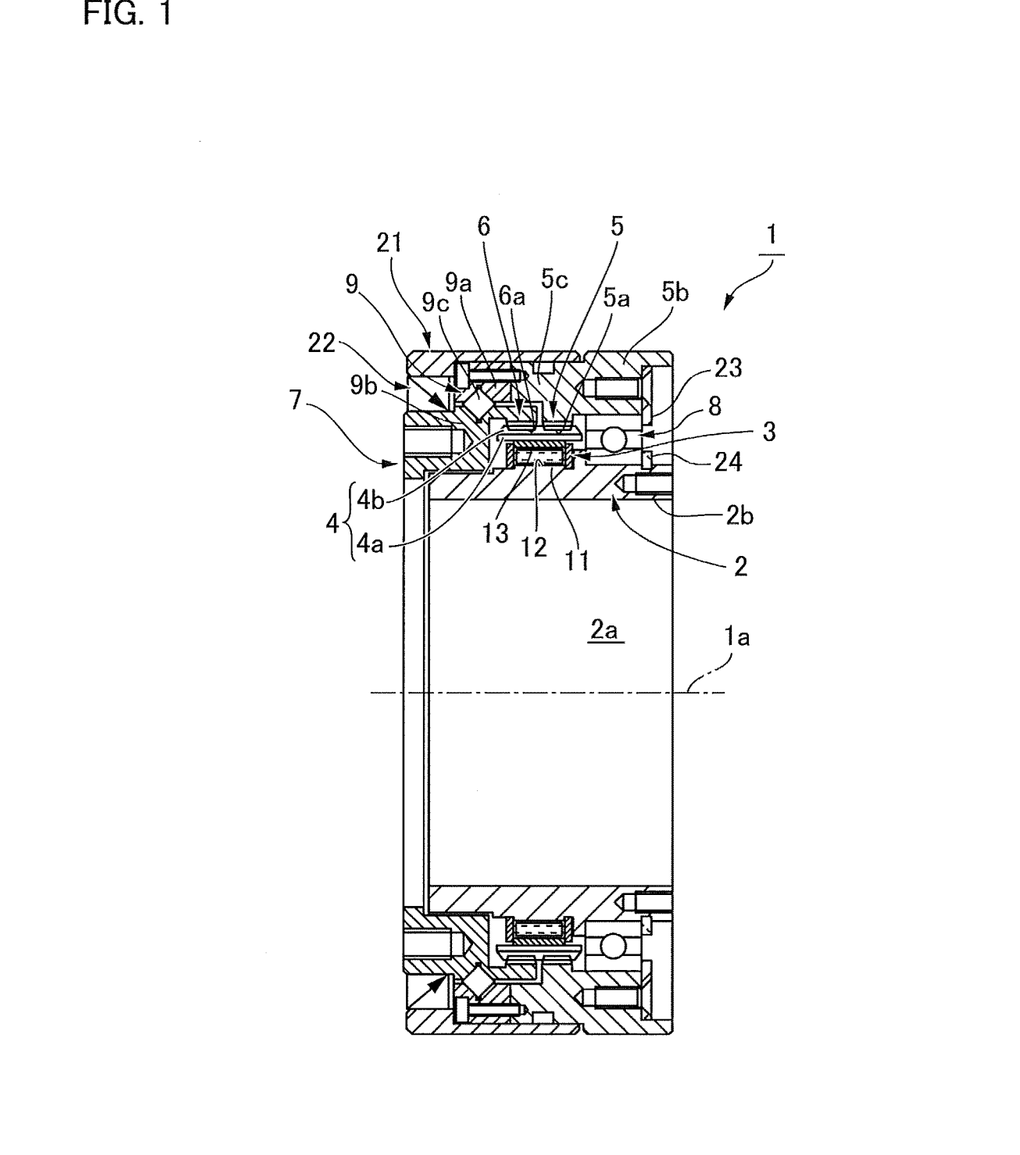
FIG. 1 is a longitudinal cross-sectional view showing a hollow strain wave gearing to which the present invention is applied.

FIG. 1 is a longitudinal cross-sectional view showing a hollow strain wave gearing according to the present embodiment. The hollow strain wave gearing 1 has a hollow input shaft 2, a wave generator 3 that rotates integrally with the hollow input shaft 2, a flexible externally toothed gear 4, a first rigid internally toothed gear 5, a second rigid internally toothed gear 6, and an annular output flange 7. A hollow part 2a of the hollow input shaft 2, circular in cross section, extends through the hollow strain wave gearing 1 in the direction of the device axis line 1a.

The hollow input shaft 2 is supported in a rotatable state by the first rigid internally toothed gear 5 via a ball bearing 8. The second rigid internally toothed gear 6 is supported in a rotatable state by the first rigid internally toothed gear 5 via a crossed roller bearing 9. In the strain wave gearing 1, the side that has the output flange 7 in the direction of the axis line 1a is referred to as the rotation output side, and the opposite side is referred to as the rotation input side.

An output shaft (not shown) of a motor is secured via a coupling or the like to a shaft end part 2b on the rotation input side of the hollow input shaft 2. The wave generator 3 is line direction. The wave generator 3 has a rigid plug 11 formed integrally in the external peripheral surface portion of the hollow input shaft 2, and a needle roller bearing 13 mounted on an ellipsoidal plug external peripheral surface 12 of the rigid plug 11.

The cylindrical flexible externally toothed gear 4 is disposed on the external peripheral side of the wave generator 3. The flexible externally toothed gear 4 has a cylinder body 4a capable of flexing in the radial direction, and external teeth 4b formed in the external peripheral surface of the cylinder body 4a. The first rigid internally toothed gear 5 and the second rigid internally toothed gear 6 are coaxially disposed on the external peripheral side of the flexible externally toothed gear 4, adjacent to each other along the axis line 1a of the gearing. The first rigid internally toothed gear 5 is disposed on the rotation input side, and the second rigid internally toothed gear 6 is disposed on the rotation output side. The flexible externally toothed gear 4 is made to flex into an ellipsoidal shape by the wave generator 3. The external teeth 4b at both major axis ends of the flexible externally toothed gear 4 flexed into an ellipsoidal shape are respectively meshed with first internal teeth 5a and second internal teeth 6a of the first and second rigid internally toothed gears 5, 6.

In the first rigid internally toothed gear 5, the external peripheral portion protrudes in an annular shape on both the rotation input side and the rotation output side, forming an input-side annular part 5b and an output-side annular part 5c. A ball bearing 8 is mounted between the input-side annular part 5b and the circular external peripheral surface portion of the hollow input shaft 2 that is farther toward the rotation input side than the rigid plug 11.

An outer ring 9a of the crossed roller bearing 9 is secured in a fastened manner coaxially to the annular end surface in the output-side annular part 5c of the first rigid internally toothed gear 5. An annular inner ring 9b on which the second rigid internally toothed gear 6 is integrally formed is disposed on the inner side of the outer ring 9a. An annular trajectory, rectangular in cross section, is formed between the outer ring 9a and the inner ring 9b. Rollers 9c are mounted in a rotatable state in this trajectory. The output flange 7 protruding in an annular shape toward the rotation output side is integrally formed in the inner ring 9b. A load-side member (not shown) is secured in a fastened manner to the output flange 7.

A cylindrical cover 21 is attached to the hollow strain wave gearing 1 from the rotation output side. The cylindrical cover 21 covers the outer ring 9a of the crossed roller bearing 9 and the first rigid internally toothed gear 5. An oil seal 22 is mounted on the inner side of the rotation-output-side end of the cylindrical cover 21, sealing the rotation-output-side end surface of the crossed roller bearing 9. An annular outer ring stopper 23 is secured in a fastened manner to the rotation-input-side end surface of the input-side annular part 5b of the first rigid internally toothed gear 5, and an annular inner ring stopper 24 is fastened to the external periphery of the shaft end part of the hollow input shaft 2.

In the hollow strain wave gearing 1 thus configured, the number of teeth of the first rigid internally toothed gear 5 is 2n greater (n being a positive integer) than the number of teeth of the second rigid internally toothed gear 6. Commonly, there are two more teeth. The number of teeth of the second rigid internally toothed gear 6 and the number of teeth of the flexible externally toothed gear 4 are the same. The first rigid internally toothed gear 5 is secured to a stationary-side member (not shown) so as to not rotate. When the wave generator 3 is rotated at a high speed by a motor or the like, the meshing positions of the external teeth 4b and the first and second internal teeth 5a, 6a move in the circumferential direction. As a result, the flexible externally toothed gear 4 rotates at a rotational speed that is reduced in accordance with the difference in the number of teeth between the first rigid internally toothed gear 5 and the flexible externally toothed gear 4. The second rigid internally toothed gear 6, which has the same number of teeth as the flexible externally toothed gear 4, rotates integrally with the flexible externally toothed gear 4. Therefore, reduced rotation is outputted to the load-side member from the output flange 7 on which the second rigid internally toothed gear 6 is formed integrally.

Wave Generator

Figure 2:
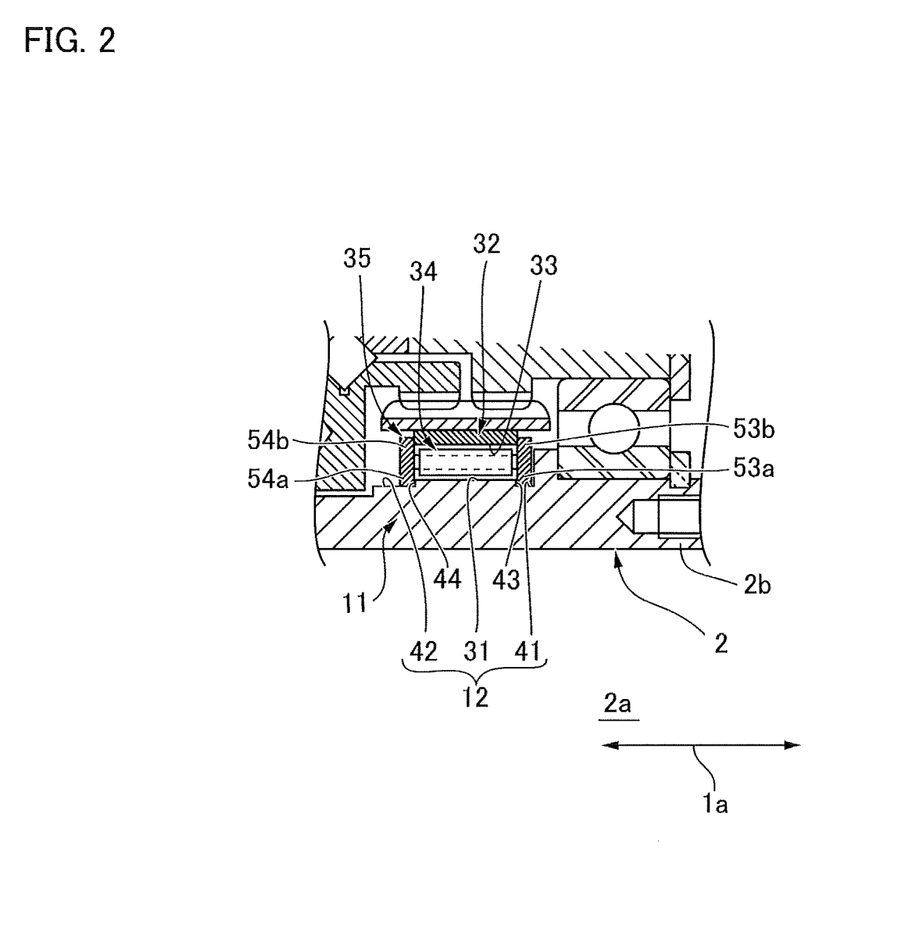
FIG. 2 is a partial cross-sectional view showing a portion including the wave generator taken out from FIG. 1.
Figure 3:
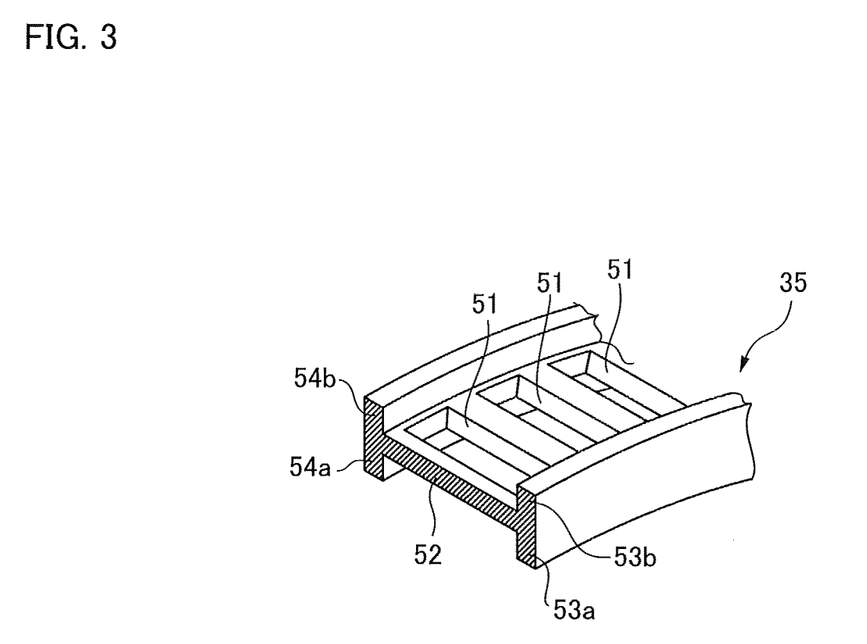
FIG. 3 is a partial perspective view showing the retainer of the roller bearing of the wave generator of FIG. 1.

FIG. 2 is a partial cross-sectional view showing a portion including the wave generator taken out from FIG. 1. FIG. 3 is a partial perspective view showing the retainer of the needle roller bearing of the wave generator 3. Describing with reference to FIGS. 2 and 3, the wave generator 3 has the rigid plug 11, and the needle roller bearing 13 mounted to the ellipsoidal plug external peripheral surface 12 of the rigid plug 11. The needle roller bearing 13 has an ellipsoidal inner ring trajectory surface 31 formed in the ellipsoidal plug external peripheral surface 12, a cylindrical outer ring 32 capable of flexing in the radial direction, an outer ring trajectory surface 33 formed in the inner peripheral surface of the outer ring 32, and a plurality of needle rollers 34 mounted between the inner ring trajectory surface 31 and the outer ring trajectory surface 33. The needle rollers 34 are held in a rollable state at constant intervals in the circumferential direction by a cylindrical retainer 35 capable of flexing in the radial direction.

Formed in the plug external peripheral surface 12 of the rigid plug 11 is a retainer engaging part that engages with the retainer 35, which would move in the direction of the device axis line 1a (the center axis line direction of the needle roller bearing), and that restricts the retainer 35 from moving in the direction of the device axis line 1a. Formed in the retainer 35 is an outer ring engaging part that engages with the outer ring 32, which would move in the direction of the device axis line 1a of the gearing, and that restricts the outer ring 32 from moving in the direction of the axis line 1a of the gearing. The structures of the retainer engaging part and the outer ring engaging part are described below.

First, a first small-diameter external peripheral surface portion 41 and a second small-diameter external peripheral surface portion 42, both ellipsoidal and slightly smaller than the inner ring trajectory surface 31, are formed on both side portions of the inner ring trajectory surface 31 in the plug external peripheral surface 12. A first annular stepped surface 43 that faces the rotation input side (faces one way in the axis line 1a direction) is formed between the inner ring trajectory surface 31 and the first small-diameter external peripheral surface portion 41. A second annular stepped surface 44 that faces the rotation output side (faces the other way in the axis line 1a direction) is formed between the inner ring trajectory surface 31 and the second small-diameter external peripheral surface portion 42.

As can be seen from FIG. 3, the retainer 35 has: a cylindrical part 52 of constant width, in which pockets 51 for holding the needle rollers 34 in a rollable state are formed at constant intervals in the circumferential direction; first and second annular inner-side protrusions 53a, 54a protruding radially inward from both ends of the cylindrical part 52; and first and second annular outer-side protrusions 53b, 54b protruding radially outward from the ends of the cylindrical part 52. Specifically, a flat H-shaped cross-sectional shape is formed.

The retainer 35 is disposed on the external periphery of the rigid plug 11 so that the inner ring trajectory surface 31 is positioned between the first and second annular inner-side protrusions 53a, 54a in the retainer 35 thus shaped, and the needle rollers 34 held in the pockets 51 of the retainer 35 are in contact with the inner ring trajectory surface 31. The outer ring 32 is disposed on the external periphery of the retainer 35 so that the outer ring is positioned between the first and second annular outer-side protrusions 53b, 54b in the retainer 35, and the needle rollers 34 held in the pockets 51 are in contact with the outer ring trajectory surface 33 of the outer ring 32.

When the retainer 35 would move in the direction of the device axis line 1a, one of the first and second annular inner-side protrusions 53a, 54a on the sides comes in contact with one of the first and second annular stepped surfaces 43, 44 formed in the plug external peripheral surface 12. Consequently, the first and second annular stepped surfaces 43, 44 of the plug external peripheral surface 12 function as retainer engaging parts, restricting the retainer 35 from moving in the direction of the device axis line 1a.

When the outer ring 32 would move in the direction of the device axis line 1a, the outer ring 32 comes in contact with one of the first and second annular outer-side protrusions 53b, 54b on the sides of the retainer 35. Consequently, the first and second annular outer-side protrusions 53b, 54b function as outer ring engaging parts, restricting the outer ring 32 from moving in the direction of the device axis line 1a. Because the retainer 35 is restricted from moving in the direction of the device axis line 1a of the gearing by the rigid plug 11 as described above, the outer ring 32 is restricted from moving in the direction of the device axis line 1a by the rigid plug 11, via the retainer 35.

Another Example of the Retainer

Figure 4A:
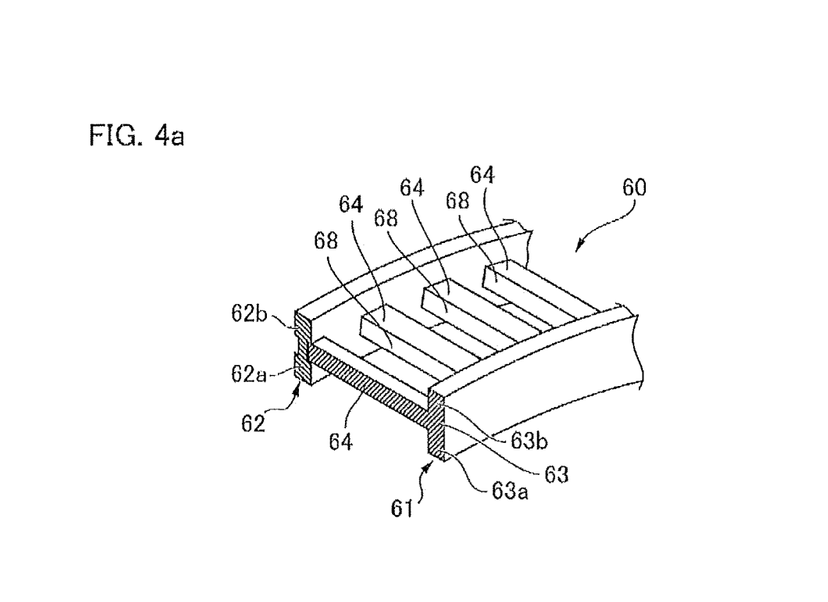
FIG. 4a and FIG. 4b are a partial perspective view and an explanatory drawing showing an assembling type retainer that can be used in place of the retainer of FIG. 3.
Figure 4B:
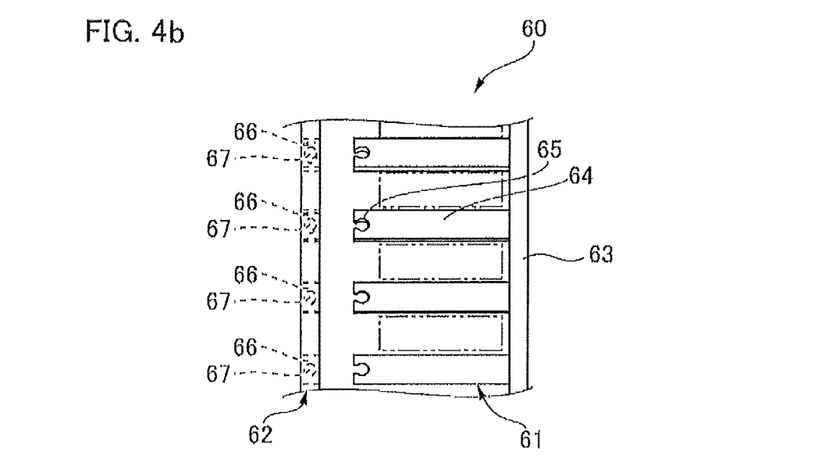

FIGS. 4(a) and (b) are a partial perspective view and an explanatory drawing showing another example of the retainer 35. A retainer 60 shown in these drawings has an annular retainer main body 61 and an annular rib 62, and the annular rib 62 can be attached to and detached from the retainer main body 61. In the retainer main body 61, connecting plates 64 protrude in parallel at constant intervals from an annular side surface on the inner side of an annular rib 63. Connecting concavities 65 formed in the tips of the connecting plates 64 can be attached to and detached from connecting shafts 67 formed inside insertion holes 66, the insertion holes 66 being formed in the other annular rib 62. When the annular rib 62 is connected to the retainer main body 61, the retainer 60 is obtained in which pockets 68 for holding needle rollers are formed at constant intervals in the circumferential direction.

In the assembling-type retainer 60 thus configured, annular inner-side protrusions 63a, 62a, which protrude from the radial inner sides of the left and right annular ribs 63, 62, are portions that can come in contact with the first and second annular stepped surfaces 43, 44 of the rigid plug 11. The outer ring 32 can also come in contact with annular outer-side protrusions 63b, 62b which protrude from the radial outer sides in the left and right annular ribs 63, 62 of the retainer 60.

Next, the needle roller bearing 13 shown in FIGS. 1 and 2 can be multiple rows of needle roller bearings. In this case, needle rollers 34 are preferably disposed in two rows, corresponding to the meshing position of the first rigid internally toothed gear 5 and the flexible externally toothed gear 4 and the meshing position of the second rigid internally toothed gear 6 and the flexible externally toothed gear 4.

Figure 5:
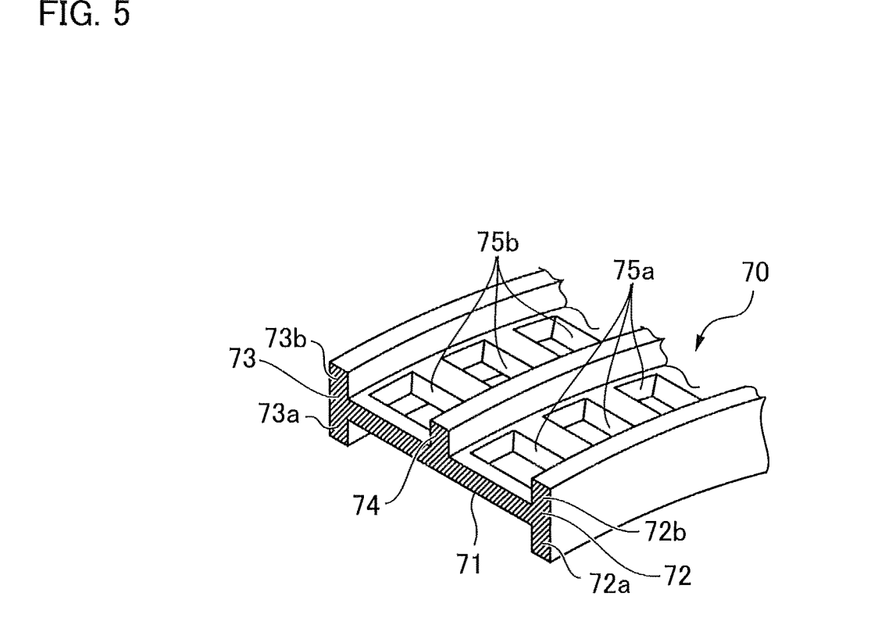
FIG. 5 is an explanatory drawing showing a retainer of a multiple-row roller bearing to which the present invention is applied.

FIG. 5 is a partial perspective view showing an example of a two-row retainer used in this case. A retainer 70 has a cylinder body 71, and annular ribs 72, 73, rectangular in cross section, formed at the ends of the cylinder body. An annular rib 74 extending in the circumferential direction is formed in the widthwise middle of the cylinder body 71. First and second pockets 75a, 75b for holding needle rollers are formed at constant intervals in the circumferential direction on both sides of the annular rib 74.

In the retainer 70 thus configured, annular inner-side protrusions 72a, 73a, which protrude from the radial inner sides of the left and right annular ribs 72, 73, are portions that can come in contact with the first and second annular stepped surfaces 43, 44 of the rigid plug 11. The outer ring 32 can also come in contact with annular outer-side protrusions 72b, 73b which protrude from the radial outer sides in the left and right annular ribs 72, 73 of the retainer 70.

Figure 6:
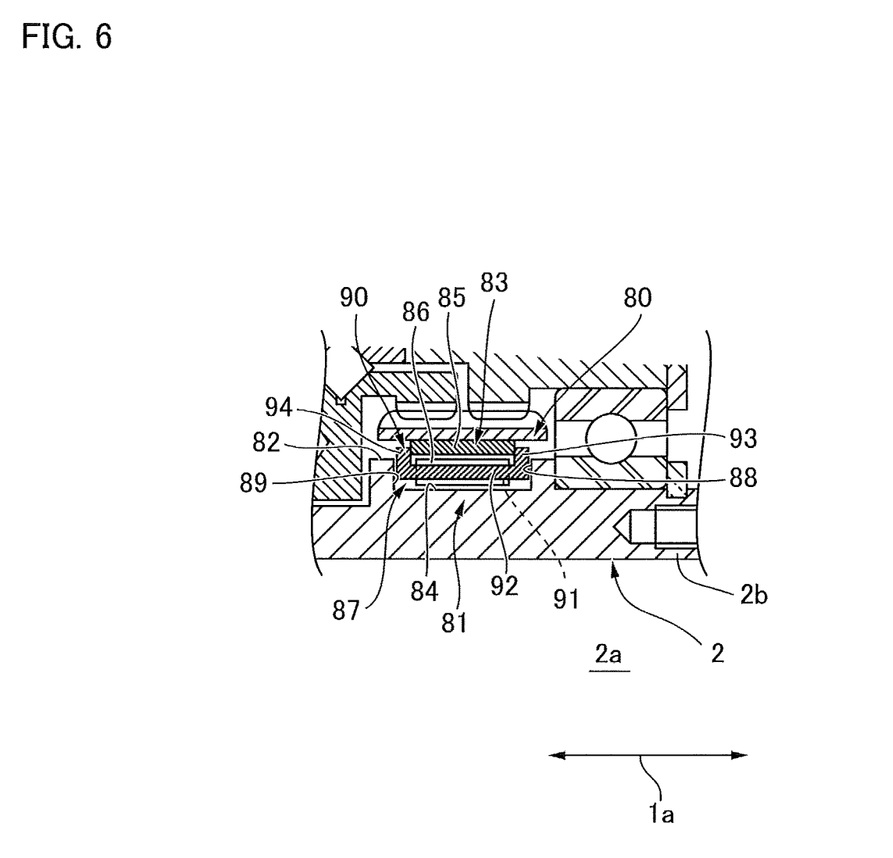
FIG. 6 is a partial cross-sectional view showing another example of a wave generator to which the present invention is applied.

Next, FIG. 6 is a partial cross-sectional view showing another example of the wave generator 3. In FIG. 6, the same symbols are used for the corresponding parts of FIGS. 1 and 2, and descriptions thereof are omitted. The wave generator 80 of the present example has a rigid plug 81 formed integrally in the hollow input shaft 2, and a needle roller bearing 83 mounted on an ellipsoidal plug external peripheral surface 82 of the rigid plug 81. The needle roller bearing 83 has an inner ring trajectory surface 84 formed in the plug external peripheral surface 82, an annular outer ring 85 capable of flexing in the radial direction, needle rollers 86 mounted in a rollable state between the trajectory surface and the outer ring, and a retainer 90 for holding the needle rollers 86.

In the wave generator 80 of the present example, the retainer engaging parts and the outer ring engaging parts are configured as follows. First, formed in the plug external peripheral surface 82 is an inner ring trajectory groove 87 extending in the circumferential direction and having a constant width and a constant depth. The ellipsoidal inner ring trajectory surface 84 is formed in a groove bottom surface of the inner ring trajectory groove 87.

The retainer 90 has a cylindrical part 92 in which pockets 91 are formed at predetermined intervals in the circumferential direction, and first and second annular outer-side protrusions 93, 94 protruding to the radial outer side from both ends of the cylindrical part 92. The retainer 90 is disposed inside the inner ring trajectory groove 87, and the outer ring 85 is disposed between the first and second annular outer-side protrusions 93, 94.

When the retainer 90 moves in the direction of the device axis line 1a, both end surfaces thereof come in contact with groove side surfaces 88, 89 on the sides of the inner ring trajectory groove 87, and the retainer 90 is restricted from moving. Consequently, the groove side surfaces 88, 89 function as retainer engaging parts. When the outer ring 85 moves in the direction of the device axis line 1a, both end surfaces thereof come in contact with the first and second annular outer-side protrusions 93, 94 on the sides of the retainer 90. Consequently, the first and second annular outer-side protrusions 93, 94 function as outer ring engaging parts.

Other Embodiments

The above example is an example in which the present invention is applied to a wave generator of a flat strain wave gearing. The present invention can similarly be applied to a wave generator of a cup-shaped strain wave gearing or a top-hat-shaped strain wave gearing.

The invention claimed is:

1. A wave generator of a strain wave gearing in which a flexible externally toothed gear is made to flex into an ellipsoidal shape and partially mesh with a rigid internally toothed gear, and meshing positions of the two gears are moved in a circumferential direction; the wave generator comprising:
a rigid plug and a roller bearing mounted on an ellipsoidal plug external peripheral surface of the rigid plug, wherein
the roller bearing has an ellipsoidal inner ring trajectory surface formed in the plug external peripheral surface, an outer ring capable of flexing in a radial direction, an outer ring trajectory surface formed in an inner peripheral surface of the outer ring, a plurality of rollers mounted in a rollable state between the inner ring trajectory surface and the outer ring trajectory surface, and a cylindrical retainer having pockets in which each of the rollers is held in a rollable state at predetermined intervals;
the plug external peripheral surface has a retainer engaging part for engaging with the retainer that would move in an axis line direction of the roller bearing and for restricting a movement of the retainer in the axis line direction; and
the retainer has an outer ring engaging part for engaging with the outer ring that would move in the axis line direction and for restricting a movement of the outer ring in the axis line direction, and wherein
first and second small-diameter external peripheral surface portions smaller in diameter than the inner ring trajectory surface are formed in the plug external peripheral surface in portions on both sides of the inner ring trajectory surface;
a first annular stepped surface facing one way in the axis line direction is formed between the inner ring trajectory surface and the first small-diameter external peripheral surface portion, and a second annular stepped surface facing the other way in the axis line direction is formed between the inner ring trajectory surface and the second small-diameter external peripheral surface portion;
the retainer has a cylinder part in which the pockets are formed at predetermined intervals in the circumferential direction, first and second annular inner-side protrusions protruding radially inward from both ends of the cylinder part, and first and second annular outer-side protrusions protruding radially outward from both ends of the cylinder part;
the inner ring trajectory surface is positioned between the first and second annular inner-side protrusions;
the outer ring is positioned between the first and second annular outer-side protrusions;
the retainer engaging part is comprised of the first and second annular stepped surfaces; and
the outer ring engaging part is comprised of the first and second annular outer-side protrusions.

2. A wave generator of a strain wave gearing in which a flexible externally toothed gear is made to flex into an ellipsoidal shape and partially mesh with a rigid internally toothed gear, and meshing positions of the two gears are moved in a circumferential direction; the wave generator comprising:
a rigid plug and a roller bearing mounted on an ellipsoidal plug external peripheral surface of the rigid plug, wherein
the roller bearing has an ellipsoidal inner ring trajectory surface formed in the plug external peripheral surface, an outer ring capable of flexing in a radial direction, an outer ring trajectory surface formed in an inner peripheral surface of the outer ring, a plurality of rollers mounted in a rollable state between the inner ring trajectory surface and the outer ring trajectory surface, and a cylindrical retainer having pockets in which each of the rollers is held in a rollable state at predetermined intervals;
the plug external peripheral surface has a retainer engaging part for engaging with the retainer that would move in an axis line direction of the roller bearing and for restricting a movement of the retainer in the axis line direction; and
the retainer has an outer ring engaging part for engaging with the outer ring that would move in the axis line direction and for restricting a movement of the outer ring in the axis line direction, and wherein
an inner ring trajectory groove extending in the circumferential direction and having a constant width and constant depth is formed in the plug external peripheral surface;
the inner ring trajectory surface is formed in a groove bottom surface of the inner ring trajectory groove;
the retainer has a cylinder part in which the pockets are formed at predetermined intervals in the circumferential direction, and first and second annular outer-side protrusions protruding radially outward from both ends of the cylinder part;
the retainer is positioned in the inner ring trajectory groove while the outer ring is positioned between the first and second annular outer-side protrusions;
the retainer engaging part is comprised of groove side surfaces on both sides of the inner ring trajectory groove; and
the outer ring engaging part is comprised of the first and second annular outer-side protrusions.

3. A hollow strain wave gearing comprising:
a rigid internally toothed gear;
a flexible externally toothed gear disposed on an inner side of the rigid internally toothed gear and capable of meshing with the rigid internally toothed gear;
a wave generator for causing the flexible externally toothed gear to flex into an ellipsoidal shape to partially mesh with the rigid internally toothed gear and causing meshing positions of the two gears to move in a circumferential direction, the wave generator being disposed on an inner side of the flexible externally toothed gear; and
a rotating input shaft composed of a hollow shaft, wherein
the wave generator is the wave generator according to claim 1; and
the rigid plug of the wave generator is integrally formed in an external peripheral surface of the rotating input shaft.

4. The hollow strain wave gearing according to claim 3, wherein
a first internally toothed gear and a second internally toothed gear having different numbers of teeth and disposed in a direction of a device axis line are provided as the rigid internally toothed gear, and
the flexible externally toothed gear has a cylinder body capable of flexing in a radial direction and external teeth formed in an external peripheral surface of the cylinder body.

* * * * *